(12) United States Patent (10) Patent No.: US 12,646,006 B2
Sommer et al. (45) Date of Patent: Jun. 2, 2026

(54) MACHINE LEARNING ENGINE FOR DETERMINING DATA SIMILARITY

(71) Applicant: BLACKROCK FINANCE, INC, New York, NY (US)

(72) Inventors: Philip Frederik Sommer, New York, NY (US); Stefano Pasquali, New York, NY (US); Jerinsh Jeyapaulraj, Harrison, NJ (US); Yu-Li Chu, New York, NY (US)

(73) Assignee: BlackRock Finance, Inc., New York, NY (US)

( * ) Notice: Subject to any disclaimer, the term of this patent is extended or adjusted under 35 U.S.C. 154(b) by 1076 days.

(21) Appl. No.: 17/583,889

(22) Filed: Jan. 25, 2022

(65) Prior Publication Data

US 2023/0121968 A1 Apr. 20, 2023

Related U.S. Application Data

(60) Provisional application No. 63/256,129, filed on Oct. 15, 2021.

(51) Int. Cl.
*G06N 20/20* (2019.01)
*G06F 18/22* (2023.01)

(52) U.S. Cl.
CPC ............. *G06N 20/20* (2019.01); *G06F 18/22* (2023.01)

(58) Field of Classification Search
None
See application file for complete search history.

(56) References Cited

U.S. PATENT DOCUMENTS

| | | | |
|---|---|---|---|
| 10,540,608 B1* | 1/2020 | Dirac | G06N 20/00 |
| 2016/0359740 A1* | 12/2016 | Parandehgheibi | G06F 16/285 |
| 2017/0262818 A1* | 9/2017 | Horrell | G06Q 10/067 |
| 2017/0337266 A1* | 11/2017 | Bhatt | G06F 16/35 |
| 2019/0377825 A1* | 12/2019 | Chang | G06F 16/328 |
| 2021/0233129 A1* | 7/2021 | Bikumala | G06Q 10/0875 |

(Continued)

OTHER PUBLICATIONS

Reis et al ("Probabilistic Random Forest: A Machine Learning Algorithm for Noisy Data Sets" Jan. 2019) (Year: 2019).*

(Continued)

*Primary Examiner* — Lut Wong
(74) *Attorney, Agent, or Firm* — Haynes and Boone, LLP

(57) ABSTRACT

System and methods for training and using a machine-learning similarity framework are provided. During training, the similarity framework generates an ensemble of tress. The trees have different properties at each node. The similarity framework uses the ensemble of trees to determine similarity between objects. The objects are propagated through nodes of each tree in the ensemble of trees until the objects reach leaf nodes. The objects are propagated by comparing the properties at each node of the tree to the features of the objects until the objects reach the leaf nodes. The similarity framework determines a similarity score for every two objects in each tree and adjusts the similarity score by tree importance. The object similarity score is determined by combining the similarity scores from the trees in the ensemble of trees. The similarity framework generates a similarity matrix with the object similarity scores of the every two objects.

20 Claims, 18 Drawing Sheets

500

(56)  References Cited

U.S. PATENT DOCUMENTS

2021/0301655 A1 *  9/2021  Ranganathan  .........  E21B 41/00

OTHER PUBLICATIONS

Desai et al., "Machine Learning Fund Categorizations." ACM Conference on AI in Finance 2020, NY. ArXiv 2006.00123.
Desai et al., "On Robustness of Mutual Funds Categorization." Journal for Financial DataScience, 2021.
Desai et al., "Fund2Vec: Mutual Funds Similarity using Graph Learning." ACM Conference on AI in Finance 2021, NY. ArXiv 2106.12987.

* cited by examiner

200A

300A

Tree 302C

Tree 302B

Tree 302A

Tree 302C

Tree 302B

Tree 302A 304A
304B
304C
304D
304E
304F
304G

Figure 4A:
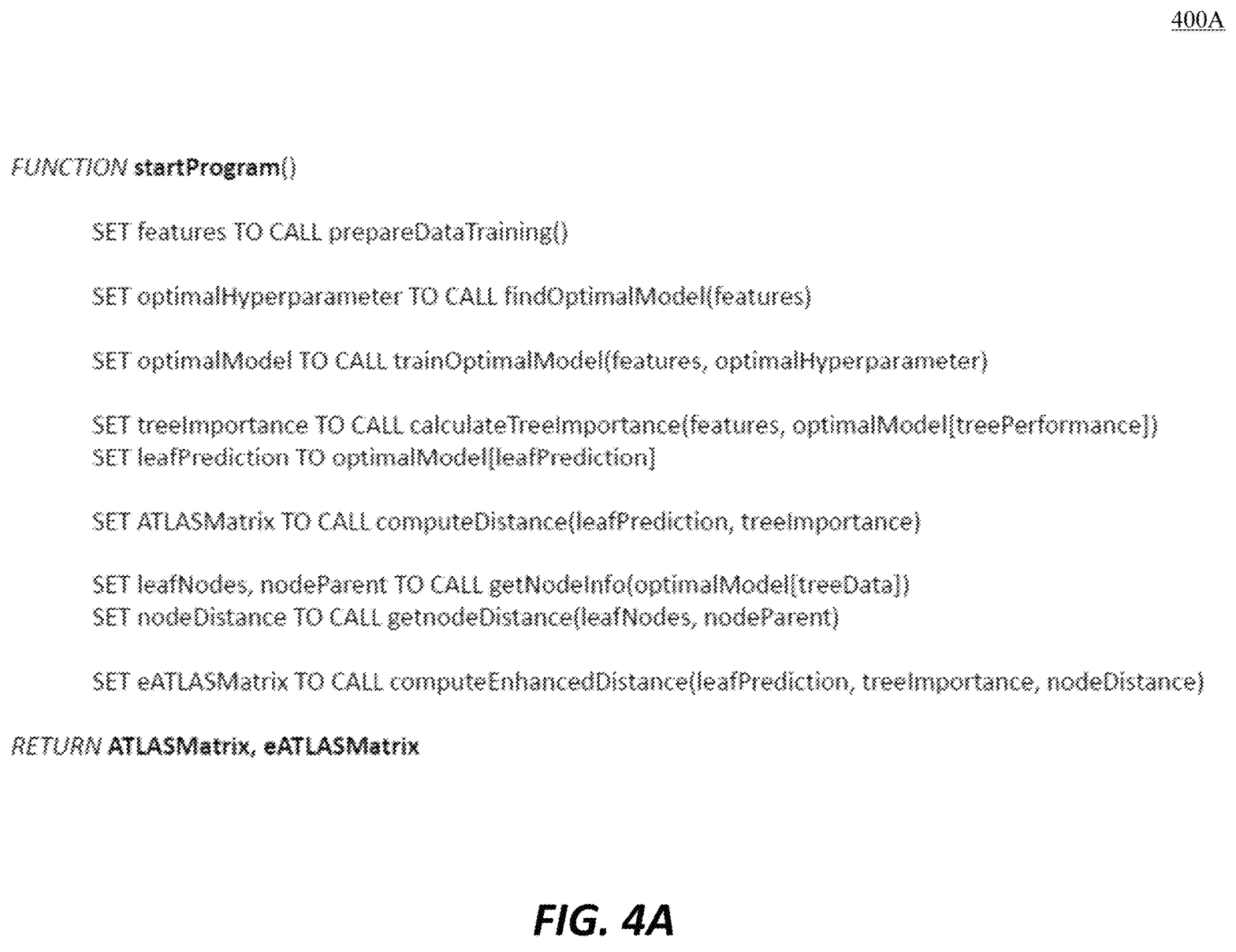

```
FUNCTION startProgram()

SET features TO CALL prepareDataTraining()

SET optimalHyperparameter TO CALL findOptimalModel(features)

SET optimalModel TO CALL trainOptimalModel(features, optimalHyperparameter)

SET treeImportance TO CALL calculateTreeImportance(features, optimalModel[treePerformance])
    SET leafPrediction TO optimalModel[leafPrediction]

SET ATLASMatrix TO CALL computeDistance(leafPrediction, treeImportance)

SET leafNodes, nodeParent TO CALL getNodeInfo(optimalModel[treeData])
    SET nodeDistance TO CALL getnodeDistance(leafNodes, nodeParent)

SET eATLASMatrix TO CALL computeEnhancedDistance(leafPrediction, treeImportance, nodeDistance)

RETURN ATLASMatrix, eATLASMatrix
```

```
FUNCTION prepareDataTraining()

READ staticFeatures, dynamicFeatures
    COMPUTE engineeredFeatures

FOR EACH ROW
        DETERMINE crossValidationFold RANDOMLY
    ENDFOR

MERGE staticFeatures, dynamicFeatures, engineeredFeatures, crossValidationFold
    INTO features RETURN features
```

```
FUNCTION findOptimalModel(features)

GENERATE hyperparameterSet RANDOMLY

FOR EACH hyperparameter IN hyperparameterSet
        SET foldScore TO EMPTY LIST FOR EACH fold IN crossValidationFold
            SET trainData TO features[crossValidationFold != fold]
            SET validData TO features[crossValidationFold == fold]
            SET model TO CALL trainGBM(trainData, validData, hyperparameter)
            APPEND model[score] TO foldScore

ENDFOR

SET hyperparameterScore TO AVERAGE(foldScore)

ENDFOR optimalHyperparameter = ARGMIN(hyperparameterScore)

RETURN optimalHyperparameter
```

Figure 4D:
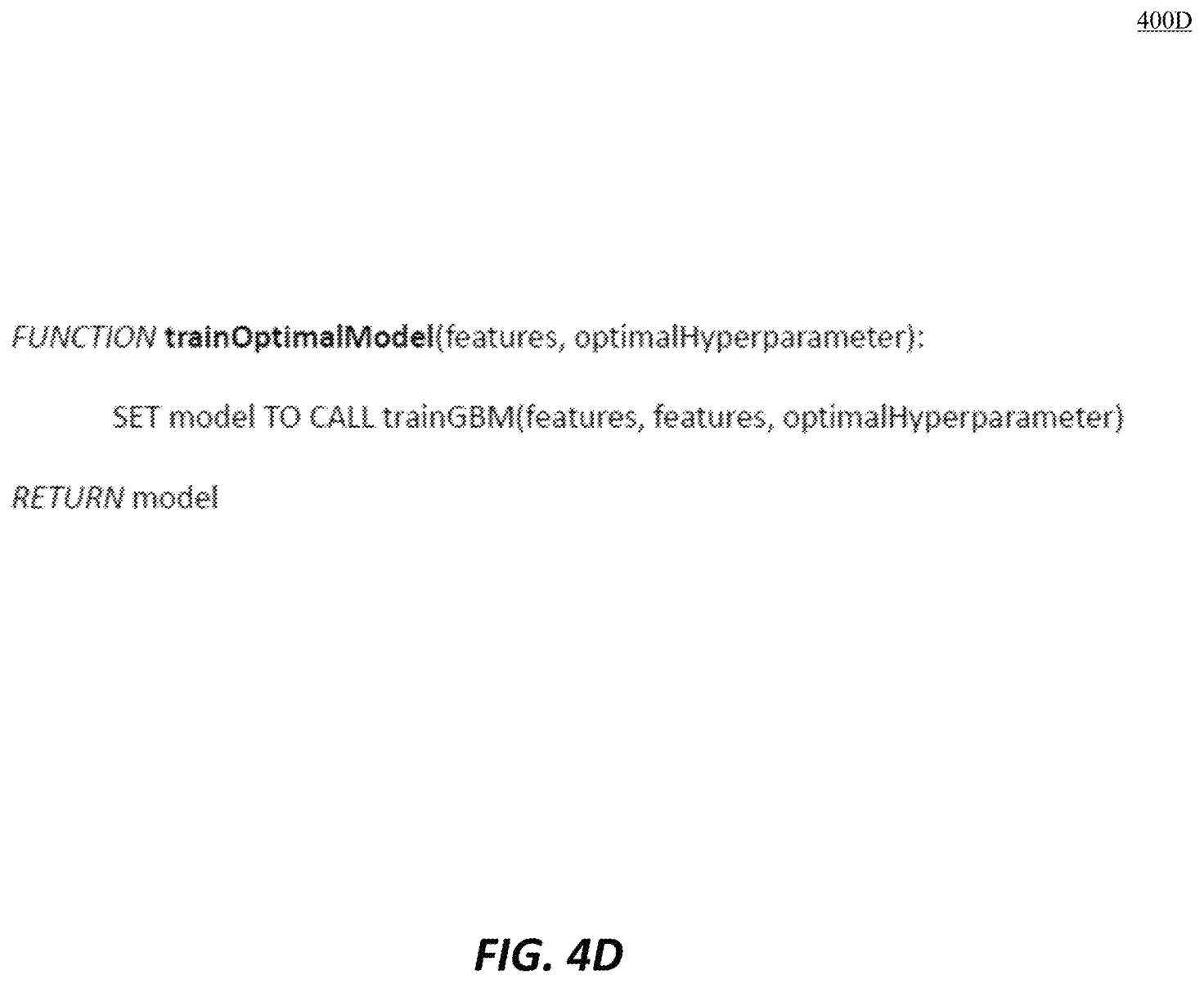

*FUNCTION* trainOptimalModel(features, optimalHyperparameter):

SET model TO CALL trainGBM(features, features, optimalHyperparameter)

*RETURN* model

```
FUNCTION calculateTreeImportance(features, treePerformance):

SET diffFromMedian TO SUBTRACT MEDIAN(features[y]) FROM features[y]
    SET absDiffFromMedian TO ABSOLUTE(diffFromMedian)

APPEND MEAN(absDiffFromMedian) TO treePerformance AT START

SET treeImportance TO SUBTRACT SHIFT(treePerformance) FROM treePerformance

SET treeImportance TO DIVIDE treeImportance BY SUM(treeImportance)

RETURN treeImportance
```

```
FUNCTION computeDistance(leafPrediction, treeImportance);

SET numObjects TO NUMBER_OF_ROWS(leafPrediction)
SET numTrees TO NUMBER_OF_COLUMNS(leafPrediction)

SET distanceMatrix TO ZEROMATRIX(numObjects, numObjects)

FOR i FROM 1 TO numObjects-1
    FOR j FROM i+1 TO numObjects

SET pairDistance TO 0

FOR k FROM 1 TO numTrees
            IF leafPrediction[i,k] EQUALS leafPrediction[j,k]
                SET pairDistance TO pairDistance+treeImportance[k]
            ENDIF
        ENDFOR SET pairDistance TO SUBTRACT 1 FROM pairDistance
        SET distanceMatrix[i,j] TO pairDistance

ENDFOR

ENDFOR

SET distanceMatrix TO ADD(distanceMatrix,TRANSPOSE(distanceMatrix))

RETURN distanceMatrix
```

```
FUNCTION getLeafPath(nodeParent, tree, node, path):

SET parent TO nodeParent[tree][node]

IF parent EQUALS NULL
        RETURN path
    ENDIF

APPEND parent TO path

RETURN getLeafPath(nodeParent, tree, parent, path)
```

Figure 4H:
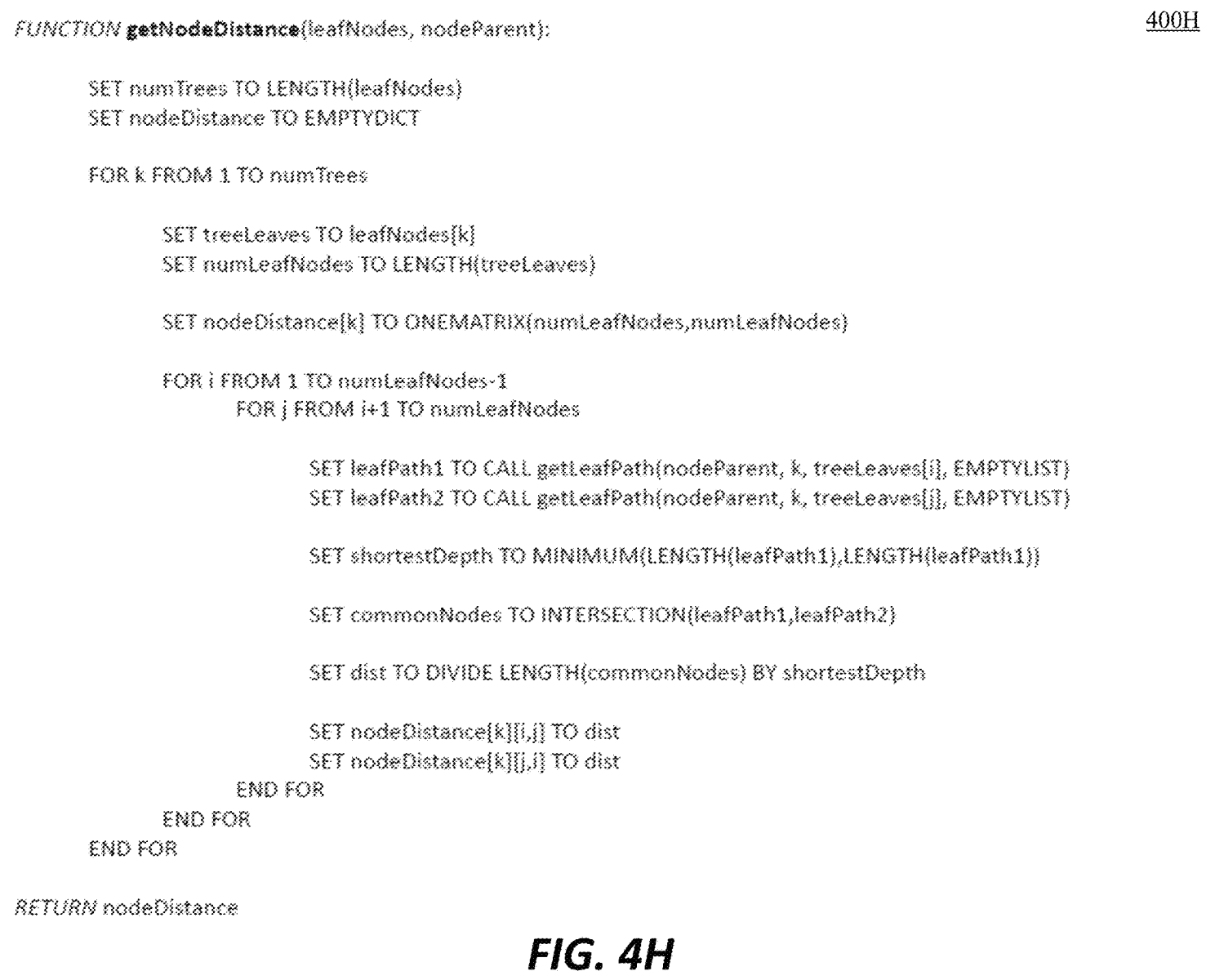

```
FUNCTION getNodeDistance(leafNodes, nodeParent):

SET numTrees TO LENGTH(leafNodes)
    SET nodeDistance TO EMPTYDICT

FOR k FROM 1 TO numTrees

SET treeLeaves TO leafNodes[k]
        SET numLeafNodes TO LENGTH(treeLeaves)

SET nodeDistance[k] TO ONEMATRIX(numLeafNodes,numLeafNodes)

FOR i FROM 1 TO numLeafNodes-1
            FOR j FROM i+1 TO numLeafNodes

SET leafPath1 TO CALL getLeafPath(nodeParent, k, treeLeaves[i], EMPTYLIST)
                SET leafPath2 TO CALL getLeafPath(nodeParent, k, treeLeaves[j], EMPTYLIST)

SET shortestDepth TO MINIMUM(LENGTH(leafPath1),LENGTH(leafPath1))

SET commonNodes TO INTERSECTION(leafPath1,leafPath2)

SET dist TO DIVIDE LENGTH(commonNodes) BY shortestDepth

SET nodeDistance[k][i,j] TO dist
                SET nodeDistance[k][j,i] TO dist

END FOR

END FOR

END FOR

RETURN nodeDistance
```

```
FUNCTION getNodeInfo(treeData):

SET leafNodes TO DICT OF EMPTYLIST
    SET nodeParent TO DICT OF EMPTYDICT

SET numTrees TO UNIQUECOUNT(treeData[tree])

FOR currentTreeNum FROM 1 TO numTrees

SET treeInfo TO treeData[tree==currentTreeNum]
        FOR EACH ROW IN treeInfo

SET currentNode TO treeInfo[node]
            SET nodeParent[currentTreeNum][currentNode] TO treeInfo[parent]

IF treeInfo[children] EQUALS NULL
                APPEND currentNode TO leafNodes[currentTreeNum]

END IF

END FOR

END FOR

RETURN leafNodes, nodeParent
```

```
FUNCTION computeEnhancedDistance(leafPrediction, treeImportance, nodeDistance):

SET numSecurities TO NUMBER_OF_ROWS(leafPrediction)
    SET numTrees TO NUMBER_OF_COLUMNS(leafPrediction)

SET distanceMatrix TO ZEROMATRIX(numSecurities,numSecurities)

FOR i FROM 1 TO numSecurities-1
        FOR j FROM i+1 TO numSecurities

SET pairDistance TO 0

FOR k FROM 1 TO numTrees

SET pairDistance TO pairDistance + nodeDistance[k][i,j] * treeImportance[k]

ENDFOR

SET pairDistance TO SUBTRACT 1 FROM pairDistance
            SET distanceMatrix[i,j] TO pairDistance

ENDFOR

ENDFOR

SET distanceMatrix TO ADD(distanceMatrix,TRANSPOSE(distanceMatrix))

RETURN distanceMatrix
```

Determine features for generating an ensemble of trees —502

Determine, using the features, trees in an ensemble of trees and one or more properties that are associated with the nodes of each tree —504

Determine importance of each tree in the ensemble of trees —506

600

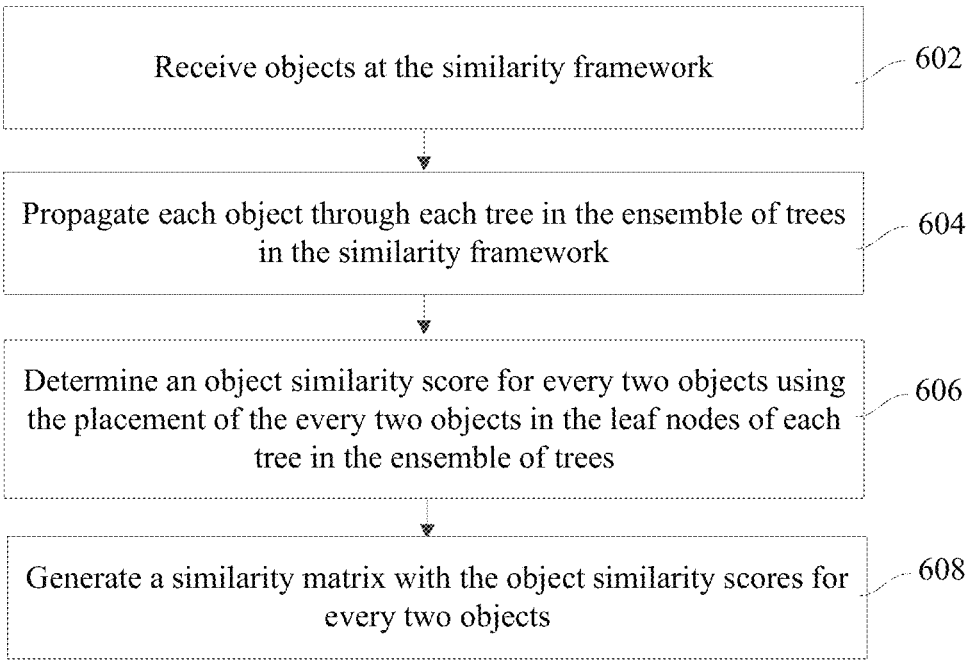

Receive objects at the similarity framework — 602

Propagate each object through each tree in the ensemble of trees in the similarity framework — 604

Determine an object similarity score for every two objects using the placement of the every two objects in the leaf nodes of each tree in the ensemble of trees — 606

Generate a similarity matrix with the object similarity scores for every two objects — 608

FIG. 6

MACHINE LEARNING ENGINE FOR DETERMINING DATA SIMILARITY

CROSS-REFERENCE TO RELATED APPLICATIONS

This application claims priority under 35 U.S.C. 119 to U.S. Provisional Application No. 63/256,129, filed Oct. 15, 2021, which is hereby incorporated by reference herein in its entirety.

TECHNICAL FIELD

The embodiments are directed to machine learning, and more particularity to a machine learning system for identifying object similarity.

BACKGROUND

Conventionally, similarity between two objects is determined using unsupervised learning techniques. These conventional techniques identity features of the objects, transform the features into a high-dimensional feature space, and use a clustering or K-nearest similarity algorithm to identify similarity of the objects.

BRIEF DESCRIPTION OF THE DRAWINGS

FIGS. 3A-B are simplified diagrams of an ensemble of trees, according to some embodiments.

FIGS. 4A-J are simplified diagrams of a pseudo-code for training and using the similarity framework, according to some embodiments.

FIG. 6 is a simplified diagram of a method for determining similarity between objects, according to some embodiments.

Figure 1:
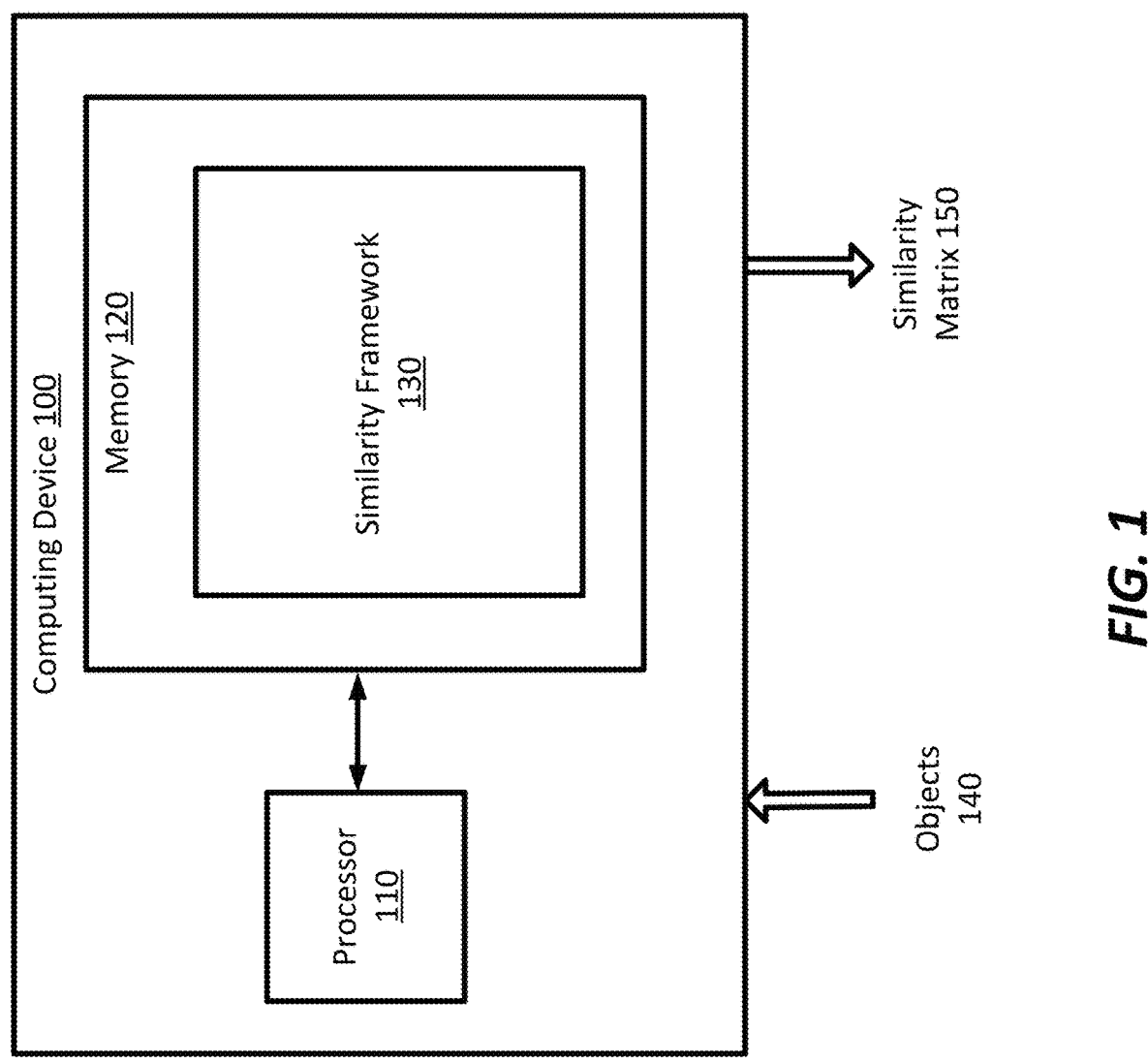
FIG. 1 is a simplified diagram of a computing device for implementing a similarity framework, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

A similarity framework can be used to identify relationships between objects and evaluate the strength between them. The output of the similarity framework may be a similarity matrix. The similarity matrix is a symmetric matrix of n×n rows and columns representing objects. An element of the matrix is a similarity score between two objects identified by the row and column of the matrix. The similarity score identifies the strength of a relationship between the two objects.

The similarity framework, such as the one described in the embodiments below, may be used to identify similarity between different types of objects. When objects are images, and the similarity framework identifies similar images, one image may replace another to be used in, e.g., image recognition systems. When objects are articles, similar articles may be identified to determine current trends. When objects are documents, similar documents may identify plagiarism. When objects are transactions, similar or dissimilar transactions may identify fraud. The similarity framework may also be used in various natural language processing tasks including text summarization, translation, etc. The similarity framework may be used to identify similar securities and substitute a security of interest with another security with similar characteristics. This has applications in trading and liquidity when, for example, a bond cannot be sourced from the market or, in another example, in portfolio construction where one or more securities may be replaced with other securities that are mostly similar but with more desirable properties or characteristics.

The similarity framework may include a supervised machine learning algorithm, such as a Gradient Boosting Machines (GBM) algorithm. The GBM algorithm may train an ensemble of decision trees using a training dataset that includes features of different objects. Once the similarity framework is trained, the similarity framework receives objects. The objects are propagated through each tree in the ensemble of decision trees until the objects reach the leaf nodes. The GBM algorithm may compute the leaf node of every tree in the ensemble that corresponds to the object. Thereafter, the similarity between two objects is defined as the percentage of trees in the ensemble where the two objects fall into the same leaf node. For example, the similarity framework may assign a similarity score of one when two objects share the same leaf node, otherwise the similarity framework may assign a score of zero. In another example, instead of assigning a score that is zero or one, the score between the two objects in the same tree may vary from zero to one based on the height of the deepest node in the tree that the objects share and the height of the tree. This means that if the two objects share a leaf node, the score may be one, if the objects split at the root, the score may be zero, or if the objects split elsewhere in the tree, the score may be a number between zero and one, based on $d_c/d$ where $d_c$ is the depth of the deepest node that the objects have in common and d is the depth of the entire tree.

In some embodiments, the similarity framework may assign different weights to the scores from different trees. The weights may be assigned based on the importance of the tree in the ensemble of trees compared to other trees in the ensemble of trees. The weight associated with each tree may be based on a reduction in the training error contributed by that tree to the ensemble of trees.

The output of the similarity framework may be a similarity matrix. The similarity matrix may include object similarity scores for pairs of objects determined from the ensemble of trees. Each object similarity score may be a combination of similarity scores generated by each tree in the ensemble of trees.

FIG. 1 is a simplified diagram of a computing device 100, according to some embodiments. As shown in FIG. 1, computing device 100 includes a processor 110 coupled to a memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities. Although illustrated as a single processor 110 and a single memory 120, the embodiments may be executed on multiple processors and stored in multiple memories.

In some examples, memory 120 may include a non-transitory, tangible, machine readable media that includes executable code that when run by one or more processors (e.g., processor 110) may cause the one or more processors to perform the methods described in further detail herein. In some embodiments, memory 120 may store a similarity framework 130. Similarity framework 130 may be trained using machine learning to identify similarity between objects. Similarity between objects may include a same or similar characteristics or a set of same or similar characteristics that satisfy an objective. Similarity may be quantified by an object similarity score. Similarity framework 130 may receive objects 140 as input. Using the objects 140, similarity framework 130 may generate a similarity matrix 150 that includes similarity scores for the objects. A similarity score between a pair of objects in the similarity matrix 150 may identify similarity between the pair of objects.

Figure 2A:
FIGS. 2A-C are simplified diagrams of a similarity framework, according to some embodiments.
Figure 2A:
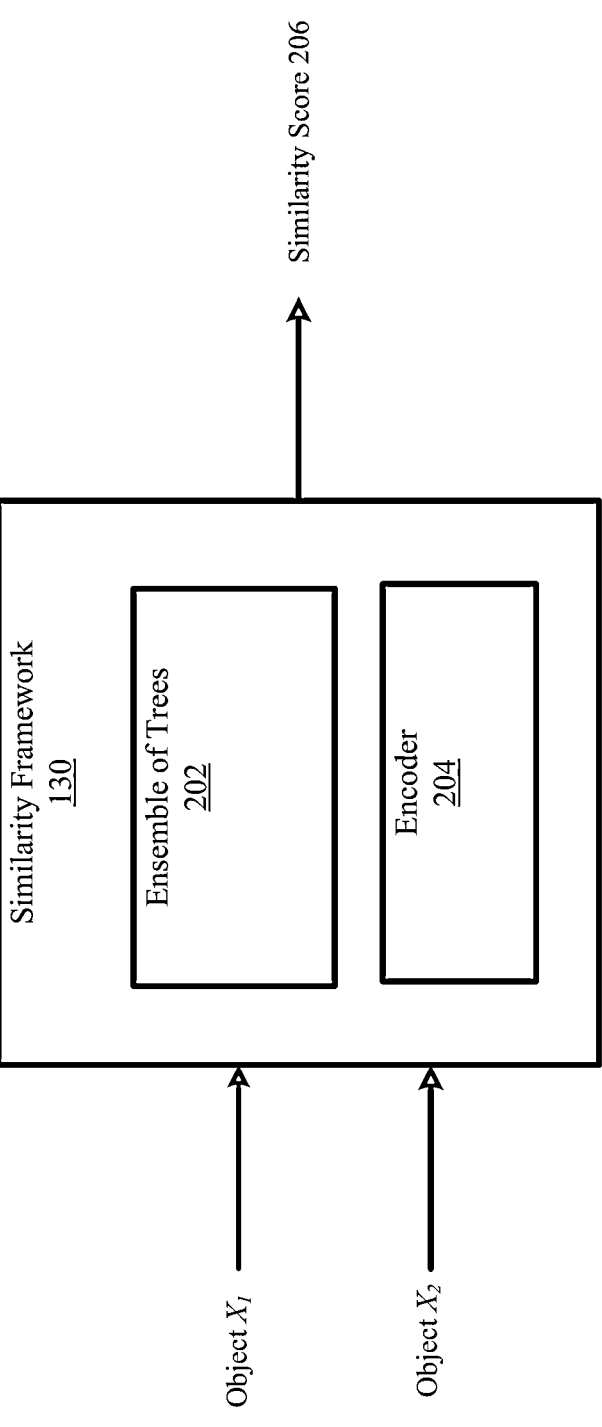

FIG. 2A is a block diagram 200A of similarity framework 130, according to some embodiments. Similarity framework 130 may include an ensemble of trees 202. Trees in the ensemble of trees 202 may be decision trees, where the decision at each node is based on one or more properties associated with the node. The similarity framework 130 may be trained to identify trees in the ensemble of trees 202 as well as the properties that may be included in decision nodes of each tree. Each tree in the ensemble of trees may be a binary tree.

In some embodiments, the trees are trained using training loss. For example, if there are k number of trees, the set of training loss (TL) at each step may be defined as follows:

$$TL=(TL_0,TL_1,\ldots,TL_{K-1})\qquad\text{Equation (1)}$$

In some embodiments, the training loss may be a monotonically decreasing set of numbers that reflects that the training loss decreases with every step or tree added to the ensemble of trees 202. The training loss at each step may be a result of the performance of all the trees that preceded that step.

Similarity framework 130 may be trained to capture an importance of each tree in the ensemble of trees 202. The importance of a tree in the ensemble of trees 202 may be captured using an importance vector. To compute the importance vector, an absolute difference in the training loss is computed as follows:

$$s_0=|TL_1-TL_0|\qquad\text{Equation (2)}$$

$$s_i=|TL_i-TL_{i-1}|\,\forall i\in\{1,2,\ldots,K-1\}\qquad\text{Equation (3)}$$

Using the absolute difference in the training loss, the final importance weight for a tree may then be determined as follows:

$$w_i=\frac{s_i}{\sum_{i=0}^{K-1}s_i}\qquad\text{Equation (4)}$$

Once trees in ensemble of trees 202 are identified and trained and the corresponding weights are determined, similarity framework 130 enters an inference stage. In the inference stage, similarity scores for different objects may be determined. For example, for a given ensemble of trees 202 (also referred to as an ensemble $f$), similarity framework 130 may determine similarity between two objects $X_1$ and $X_2$ as follows. First, similarity framework 130 may propagate the two objects $X_1$ and $X_2$ down all the trees within ensemble $f$ by comparing features of the objects $X_1$ and $X_2$ to properties of the tree nodes of the trees until objects $X_1$ and $X_2$ reach the leaf nodes. Next, the terminal node position of object $X_1$ and object $X_2$ in each of the leaf nodes of the trees is recorded. Let $Z_1=(Z_{11}, Z_{12}, \ldots, Z_{1K})$ be the tree node positions for object $X_1$ and $Z_2=(Z_{21}, Z_{22}, \ldots, Z_{2K})$ be tree positions of the leaf nodes for object $X_2$. Then, the similarity S between objects $X_1$ and $X_2$ in a tree may be determined as follows:

$$S(X_1,X_2)=\Sigma_{i=0}^{K-1}I(Z_{1i}==Z_{2i})w_i\qquad\text{Equation (5)}$$

where I is the indicator function. The similarity score between objects $X_1$ and $X_2$ in a tree may then defined as:

$$D(X_1,X_2)=1-S(X_1,X_2).\qquad\text{Equation (6)}$$

By construction, D is a number that may range from 0 to 1. Similarity framework 130 repeats this process to determine similarity scores for multiple objectives in different trees in ensemble of trees 202, which results in multiple distances or tree scores given by $D_{OBJ1}(X_1,X_2)$, $D_{OBJ2}(X_1,X_2)$ and $D_{OBJ3}(X_1,X_2)$. Similarity framework 130 may combine these distances into a single distance, e.g. similarity score which may be a weighted Euclidean distance which is an overall object similarity score 206, as follows:

$$\text{Equation (7)}$$

$$D_{Combined}(X_1, X_2) = \sqrt[2]{\frac{D_{OBJ1}(X_1, X_2)^2 + D_{OBJ2}(X_1, X_2)^2 + D_{OBJ3}(X_1, X_2)^2}{3}}$$

Similarity framework 130, may determine similarity between both structured and unstructured objects. When objects $X_1$ and $X_2$ are structured objects, e.g. objects with features that may be found in a particular field in an object or quantified, similarity framework 130 may determine similarity score 206 as discussed above. When objects $X_1$ and $X_2$ are unstructured objects, e.g., objects with features that are qualitative, such as features included in objects that are text, images, etc., similarity framework 130 may first encode the features of unstructured objects $X_1$ and $X_2$ using encoder 204 into encodings. Ensemble of trees 202 may be trained on the encodings and use the encoding to determine similarity score 206.

Figure 2B:
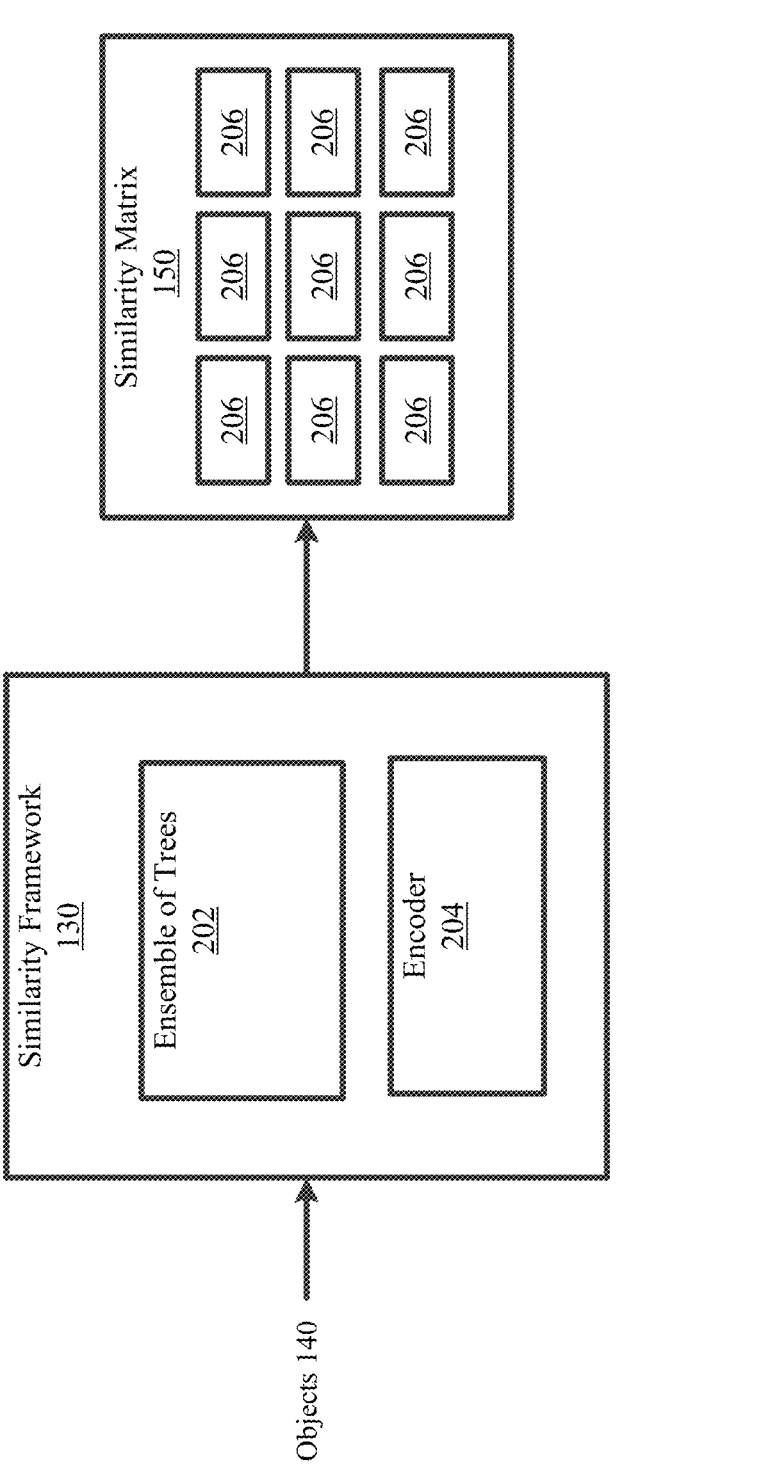

In some embodiments, similarity framework 130 may determine similarity scores for multiple objects. FIG. 2B is a block diagram 200B of similarity framework 130, according to some embodiments. As illustrated in FIG. 2B, similarity framework 130 receives objects 140 as input. Objects $X_1$ and $X_2$ discussed in FIG. 2A may be two objects in objects 140. For every two objects in objects 140, similarity framework 130 determines object similarity score 206. Using object similarity scores 206, similarity framework 130 then builds similarity matrix 150. The similarity matrix 150 is a n×n matrix where n is an integer that corresponds to a number of objects 140. The elements of the similarity matrix 150 are similarity scores 206 for objects 140. For example, each element in the similarity matrix 150 corresponds to similarity score 206 for a pair of objects in objects 140.

Figure 2C:
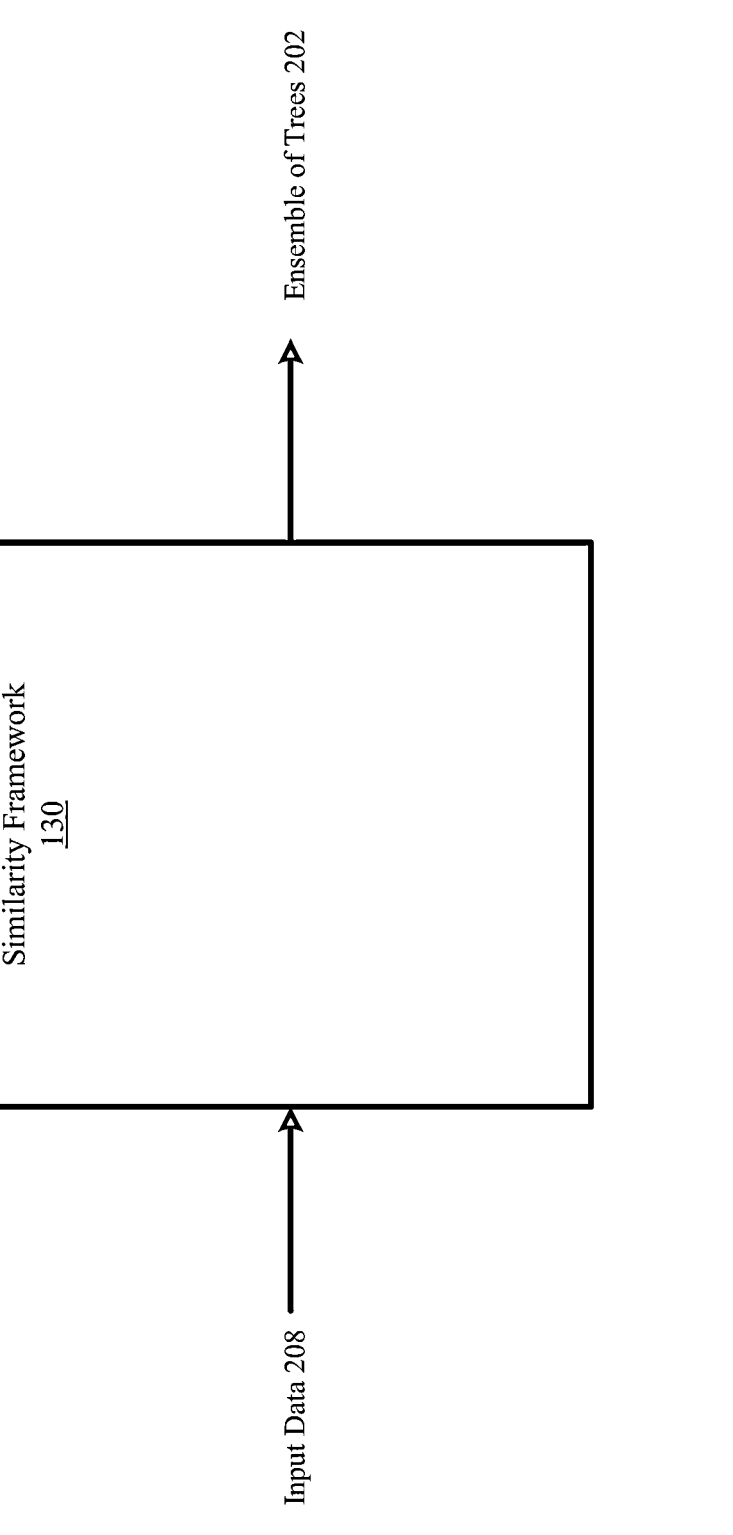

FIG. 2C is a block diagram 200C of similarity framework 130 trained to determine an ensemble of trees, according to some embodiments. During a training phase, similarity framework 130 generates trees for inclusion into ensemble of trees 202. Similarity framework 130 identifies trees using one or more functions. The functions may be determined using a function estimation method based on a dataset $(x,y)_{i=1}^{N}$ that comprises input variables x and y where $x=(x_1, x_2, \ldots, x_d)$ and corresponding labels are y. In some embodiments, the input variables may be features from different objects. The ensemble of trees 202 may be constructed to minimize the variance of the input features. The goal is to reconstruct the unknown functional dependence $$x \xrightarrow{f} y$$

with an estimate $\hat{f}(x)$, such that some specified loss function $\Psi(y,f)$ is minimized, as follows:

$$\hat{f}(x) = y \qquad \text{Equation (8)}$$

$$\hat{f}(x) = \operatorname*{argmin}_{f(x)} \Psi(y, f) \qquad \text{Equation (9)}$$

The function estimation problem may be re-written in terms of expectations where an equivalent formulation would be to minimize the expected loss function over a response variable $E_y(\Psi(y,f(x))$, conditioned on the observed explanatory data x:

$$\hat{f}(x) = \operatorname*{argmin}_{f(x)} E_x[E_y(\Psi(y, f(x)) \mid x] \qquad \text{Equation (10)}$$

The response variable y may come from different distributions. This leads to specification of different loss functions W. In particular, if the response variable is binary, i.e., $y \in \{0,1\}$, the binomial loss function may be considered. If the response variable is continuous, i.e., $y \in R$, the $L_2$ squared loss function or the robust regression Huber loss function may be used. For other response distributions, specific loss functions may be designed. To make the problem of function estimating tractable, the function search space may be restricted to a parametric family of functions $f(x,\theta)$. This may change the function optimization problem into the parameter estimation problem:

$$\hat{f}(x) = f(x, \hat{\theta}) \qquad \text{Equation (11)}$$

$$\hat{\theta} = \operatorname*{argmin}_{\theta} E_x[E_y(\Psi(y, f(x, \theta)) \mid x] \qquad \text{Equation (12)}$$

Similarity framework 130 may use iterative numerical procedures to perform parameter estimation. In some embodiments, given M iteration steps, where M is an integer, the parameter estimates may be written in an incremental form as follows:

$$\hat{\theta} = \Sigma_{i=1}^{M} \hat{\theta}_i \qquad \text{Equation (13)}$$

In some embodiments, the steepest gradient descent may be used to estimate parameters. In the steepest gradient descent, given N data points $(x,y)_{i=1}^{N}$, the empirical loss function $J(\theta)$ is decreased over this observed data, as follows:

$$J(\theta) = \Sigma_{i=1}^{N} \Psi(y_i, f(x_i, \theta)) \qquad \text{Equation (14)}$$

The steepest descent optimization procedure may be based on consecutive improvements along the direction of the gradient of the loss function $\nabla J(\theta)$. As the parameter estimates $\hat{\theta}$ are presented in an incremental way, the estimate notation is distinguished. By the subscript index of the estimates $\hat{\theta}_t$, the t-th incremental step of the estimate $\hat{\theta}$ is considered. The superscript $\hat{\theta}_t$ corresponds to the collapsed estimate of the whole ensemble, i.e., sum of all the estimate increments from step 1 to step t. The steepest descent optimization procedure may be organized as follows.

First, the parameter estimates $\hat{\theta}_0$ are initialized. Then steps two through five are repeated for each iteration t.

Second, a compiled parameter estimate $\hat{\theta}^t$ is obtained from all of the previous iterations, as follows:

$$\hat{\theta}^t = \Sigma_{i=1}^{t-1} \hat{\theta}_i \qquad \text{Equation (15)}$$

Third, the gradient of the loss function $\nabla J(\theta)$ is evaluated, given the obtained parameter estimates of the ensemble:

$$\nabla J(\theta) = \{\nabla J(\theta_i)\} = \left[ \frac{\partial J(\theta)}{\partial J(\theta_i)} \right]_{\theta = \hat{\theta}^t} \qquad \text{Equation (16)}$$

Fourth, the new incremental parameter estimate $\hat{\theta}_t$ is determined as follows:

$$\hat{\theta}_t \leftarrow -\nabla J(\theta) \qquad \text{Equation (17)}$$

Fifth, the new estimate $\hat{\theta}_t$ is added to the ensemble.

In some embodiments, similarity framework 130 may perform optimization that may occur in a function space. In this case, the function estimate $\hat{f}$ is parameterized in the additive functional form:

$$\hat{f}(x) = \hat{f}^M(x) = \Sigma_{i=0}^{M} \hat{f}_i(x) \qquad \text{Equation (18)}$$

where M is the number of iterations, $\hat{f}_0$ is the initial guess and $\{f_i\}_{i=1}^{M}$ are the function increments, also referred to as "boosts".

In some embodiments, the parameterized "base-learner" functions $h(x,\theta)$ may be distinguished from the overall ensemble function estimates $\hat{f}(x)$. Different families of base-learners functions such as decision trees or splines functions may be selected.

In a "greedy stagewise" approach for incrementing the function with the base-learners, the optimal step-size ρ may be specified at each iteration. For the function estimate at the t-th iteration, the optimization rule may be defined as follows:

$$\hat{f}_t \leftarrow \hat{f}_{t-1} + \rho_t h(x, \theta_t) \qquad \text{Equation (19)}$$

$$(\rho_t, \theta_t) = \underset{\rho, \theta}{\operatorname{argmin}} \sum_{i=1}^{N} \Psi\left(y_i, \hat{f}_{t-1}\right) + \rho h(x_i, \theta) \qquad \text{Equation (20)}$$

In some embodiments, similarity framework 130 may arbitrarily specify both the loss function $\Psi(y, f)$ and the base-learner functions $h(x, \theta)$, on demand. In some embodiments, a new function $h(x, \theta_t)$ may be the most parallel to the negative gradient $\{g_t(x_i)\}_{i=1}^{N}$ along the observed data:

$$g_t(x) = E_y \left[ \frac{\partial \Psi(y, f(x))}{\partial f(x)} \bigg| x \right]_{f(x) = \hat{f}^{t-1}(x)} \qquad \text{Equation (21)}$$

In this way, instead of looking for a general solution for the boost increment in the function space, the new function increment may be correlated with $-g_t(x)$. This simplifies the optimization task with the least-squares minimization task:

$$(\rho_t, \theta_t) = \underset{\rho, \theta}{\operatorname{argmin}} \sum_{i=1}^{N} \left[ -g_t(x_i) + \rho h(x_i, \theta) \right]^2 \qquad \text{Equation (22)}$$

In some embodiments, the GBM algorithm may be trained using Python or another programming language known in the art. The loss function $\Psi(y, f)$ may be the $L_2$ loss. The GBM algorithm may train trees on residual vectors or sign vectors.

In some embodiments, the base learner function $h(x, \theta)$ that may be used is a decision tree stump and may restrict the total number of leaf nodes to a configurable number, e.g., sixteen leaf nodes.

Figure 3A:
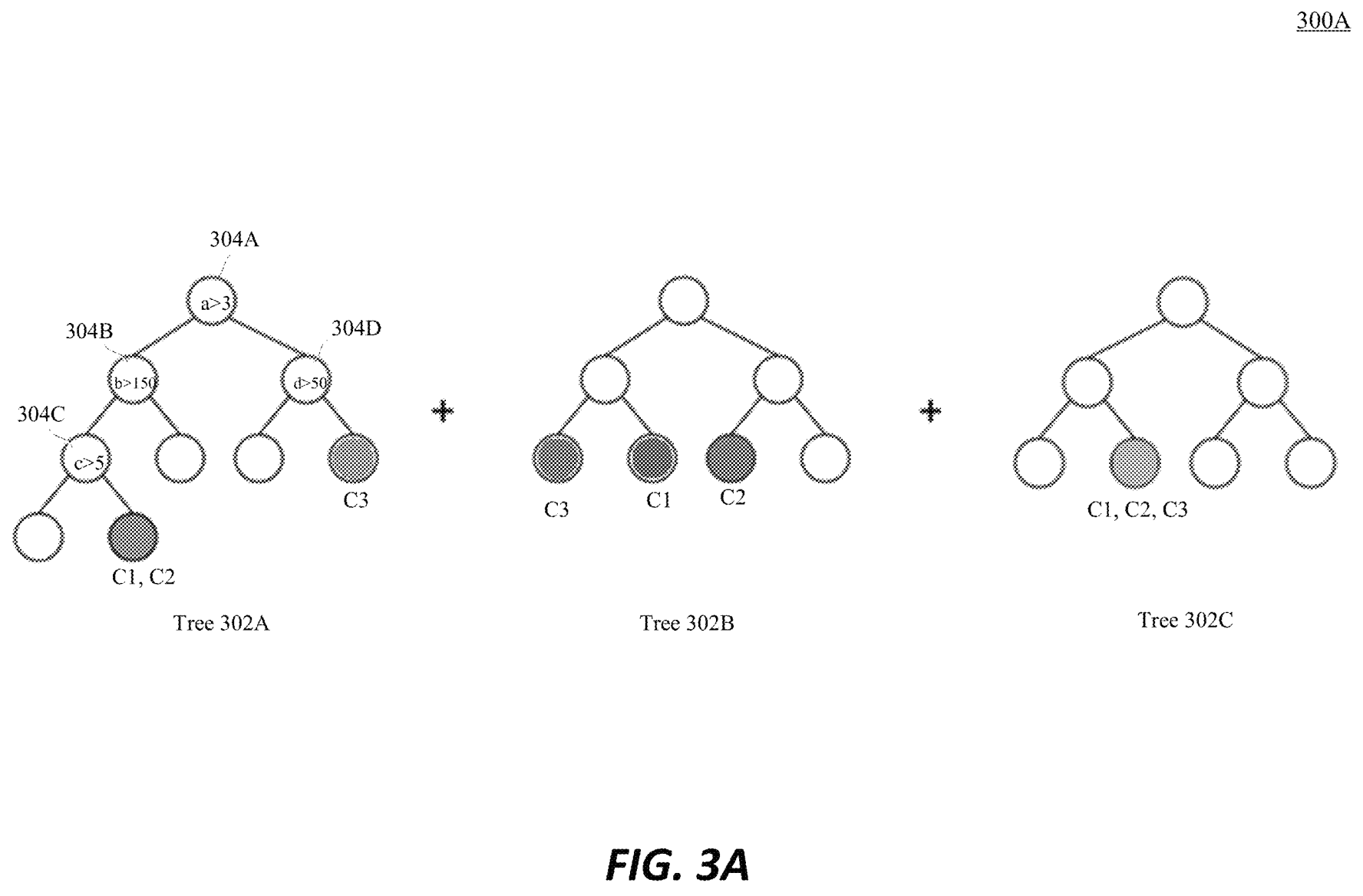
Figure 3B:
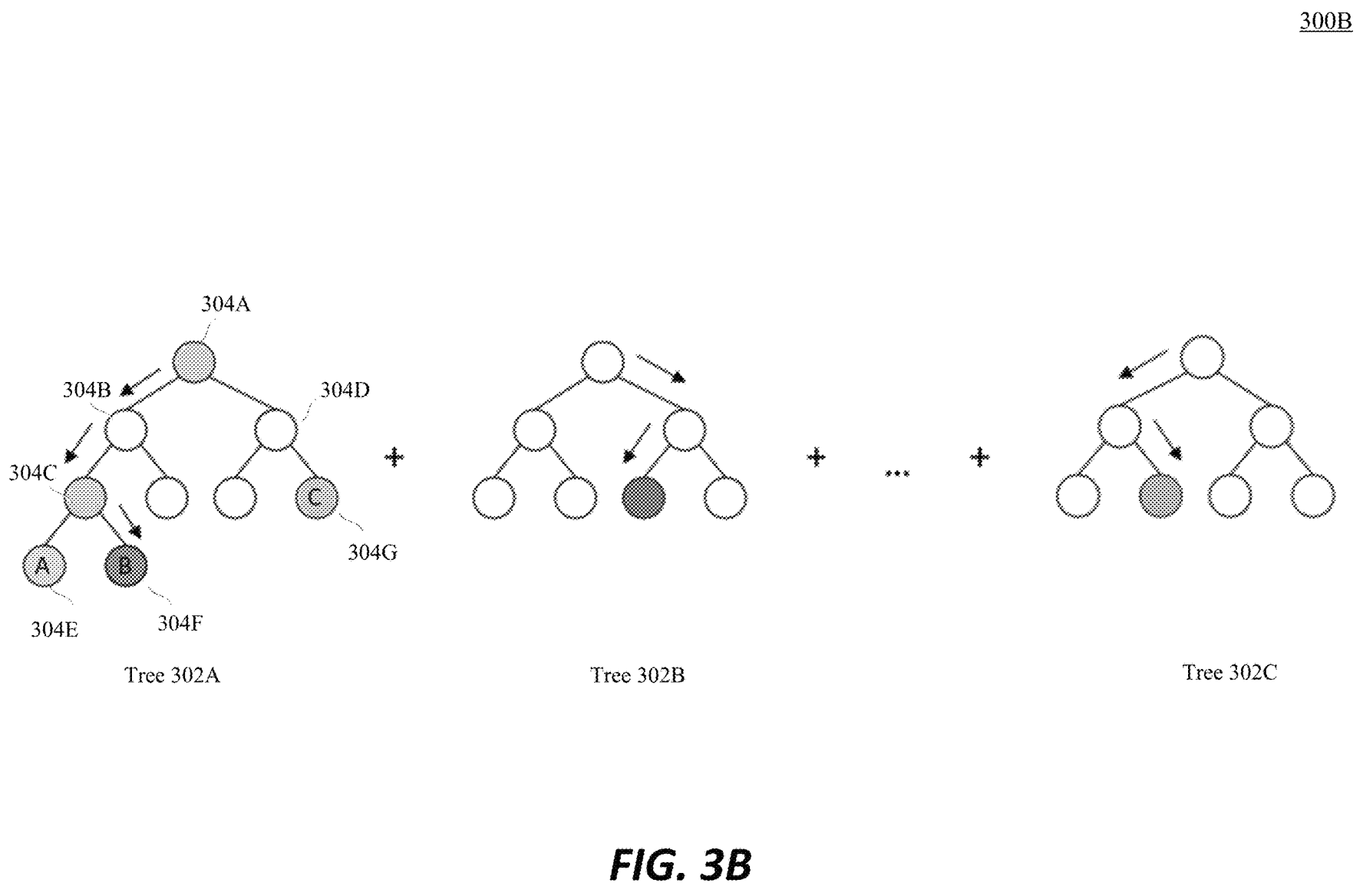

FIGS. 3A and 3B are diagrams 300A and 300B of an ensemble of trees, according to some embodiments. FIG. 3A illustrates ensemble of trees 202 that includes trees 302A, 302B, and 302C generated using similarity framework 130. Each one of trees 302A-C includes nodes associated with at least one property to which one or more input features of objects 140 may be compared. For illustrative purposes only, in tree 302A, a property associated with node 304A may be a>3, a property associated with node 304B may be b>150, a property associated with node 304C may be c>5 and a property associated with node 304D may be d>50. When objects 140, such as C1, C2, and C3 pass through trees 302A-C, the features or characteristics of objects C1-C3 are compared to the properties of tree nodes 304A-C until the objects C1-C3 reach the leaf nodes. Once the objects C1-C3 reach the leaf nodes, similarity framework 130 determines the similarity scores 206, such as a similarity score $S_{C_1 2_2}$ between objects C1 and C2 and a similarity score $S_{C_1 2_3}$ between objects C1 and C3. As discussed above, in some embodiments, the functions for determining a similarity score s may be as follows:

$$\text{similarity}, s = \frac{\text{number of trees with same leaf node}}{\text{total number of trees in the ensemble}} \qquad \text{Equation (23)}$$

As illustrated in FIG. 3A, objects C1 and C2 share a leaf node in tree 302A, and objects C1, C2, and C3 share a leaf node in tree 302C. In the case where similarity framework 130 assigns a score=1 when the objects 140 share a leaf node, and a score=0 when the objects do not share a leaf node, a similarity score $$S_{C_1 C_2} = \frac{2}{3}$$

and similarity score $$S_{C_1 C_3} = \frac{1}{3}.$$

FIG. 3B illustrates a similarity score that may be determined when objects 140 in different leaf nodes are given non-zero scores. Instead, the similarity score varies with the distances between leaf nodes, such that the similarity score increases when the leaf nodes with objects 140 are closer to each other and decreases when the leaf nodes are further away. FIG. 3B illustrates object A in a leaf node 304E, object B in a leaf node 304F, and object C in a leaf node 304G of tree 302A. Notably, the leaf nodes 304E and 304F that store respective object A and object B are closer to each other than the leaf node 304G that stores object C. Similarity score 206 for objects A, B, and C in trees 302A-C may be determined based on the depth of the deepest common node shared between the objects A and B, B and C, and A and C divided by the depth of the trees 302A-C. With respect to FIG. 3B, objects A and B share the common node 304C (depth=3) in tree 302A, with tree 302A having depth=4. Accordingly, the similarity score between objects A and B in tree 302A is ¾, the similarity score between objects A and C in tree 302A is ¼, and similarity score between objects B and C in tree 302A is ¼.

FIGS. 4A-J are diagrams of a pseudo-code for training the similarity framework and generating a similarity matrix, according to some embodiments. Notably, FIGS. 4A-4E pertain to the training stage that trains similarity framework 130 to generate ensemble of trees 202 and FIGS. 4F-4J pertain to an inference stage that determines similarity matrix 150 that includes similarity scores 206 for pairs of objects in objects 140.

FIG. 4A illustrates an example pseudo-code 400A that generates ensemble of trees 202 in similarity framework 130 and similarity matrix 150, according to some embodiments. The functions illustrated in the pseudo-code 400A of FIG. 4A are further described in FIGS. 4B-4J.

FIG. 4B illustrates an example pseudo-code 400B that identifies features, according to some embodiments. In FIG. 4B, pseudo-code 400B determines multiple features or characteristics that are included in different objects 140. The features may depend on the object type. For unstructured data, the features may be transformed into structured data using an encoder which encodes features into feature encodings. Features may be words, word types, etc., for objects 140 that are documents. Features may be pixels, pixel colors, image colors, pixel positions, image types, etc. for objects 140 that are images. Features may be sectors, issues, coupons, industry sectors, ratings, spreads, yields, dates to maturity, ages, markets, countries, etc., for objects 140 that are securities or bonds. Notably, there may be other types of features for other types of objects 140. Features may also be static, dynamic, or engineered. Static features may remain the same over a period of time, while dynamic features may change over a period of time. Engineered features may be features that are created from static or dynamic features to be included in the training data.

FIG. 4C illustrates an example pseudo-code 400C that determines an optimal hyperparameter, according to some embodiments. In FIG. 4C, pseudo-code 400C determines trees using features identified in FIG. 4B and one or more hyperparameters. The hyperparameters may be randomly generated or included in a configuration file. Example hyperparameters may include learning rate, number of leaves in each tree, minimum data or features in each leaf, and a number of trees in ensemble of trees 202.

To determine an optimal hyperparameter, multiple trees may be generated for each hyperparameter and scored. For example, for each hyperparameter, the features may be divided into a training dataset and a validation dataset. The trees, including properties and values of the properties at each node, may be generated with the GBM algorithm using the hyperparameter and the features in the training dataset. The trees may be validated with the features in the validation dataset that validates that objects in the dataset meet a particular objective. The trees may also be scored. After the trees based on the hyperparameter are generated, the hyperparameter may be scored by averaging the scores from the trees. An optimal hyperparameter may be determined using an "argmin" function, or another function, based on the scores associated with different hyperparameters. The "argmin" function, for example, identifies the hyperparameter associated with the lowest hyperparameter score from the scored hyperparameters. The lowest hyper-parameter score simulates the minimal loss discussed above.

As illustrated in FIG. 4C, the trees may be determined using a GBM algorithm. Trees may also be determined using another algorithm. As discussed above, the GBM algorithm may learn a base learner function and a loss function, which may correlate to a negative gradient to minimize loss through multiple iterations. The hyperparameter may control the step of the iterations during which the base function is learned.

The trees associated with different hyperparameters may include, but not limited to, anywhere from five to three-hundred trees and may have tree depth anywhere from five to sixteen nodes. During training, the features and the properties of the features that are associated with in each node are also determined.

FIG. 4D illustrates an example pseudo-code 400D that generates an ensemble of trees. In FIG. 4D, pseudo-code 400D determines an ensemble of trees 202 using features determined in FIG. 4B and the optimal hyperparameter determined in FIG. 4C. Similar to FIG. 4C, the ensemble of trees 202 may be determined using the GBM algorithm.

FIG. 4E illustrates an example pseudo-code 400E that determines an importance of a tree in the ensemble of trees, according to some embodiments. As discussed above, pseudo-code 400D determines ensemble of trees 202. Pseudo-code 400E determines an importance of each tree in ensemble of trees 202. For example, as each tree is added to the ensemble of trees 202, pseudo-code 400E determines the importance of the newly added tree. The importance of the newly added tree may be determined by calculating a performance of the ensemble of trees 202 before and after adding the new tree to the ensemble of trees 202, and determining by how much an error generated by the ensemble of trees 202 was reduced by adding the new tree.

FIG. 4F illustrates an example pseudo-code 400F that determines a similarity matrix, according to some embodiments. In FIG. 4F, the pseudo-code 400F receives objects 140 and generates similarity matrix 150 that includes similarity scores 206. As discussed above, each object is passed through each tree in ensemble of trees 202 where the features of the object are compared to the one or more properties of each node in the tree, until the object reaches a leaf node. Pseudo-code 400F then determines the similarity score 206 between the object and the other objects, by first determining a similarity score associated with each tree and then computing the object similarity score 206 by combining the similarity scores from the individual trees. The similarity score for each tree may be a distance between the objects in the leaf nodes of the corresponding tree, as discussed above. If the objects are in the same node, the similarity score may be one, otherwise the similarity score may be zero. Pseudo-code 400F also illustrates that the similarity score for an individual tree may be adjusted by the importance of the tree in the ensemble of trees 202. To compute the similarity score 206 for all trees, pseudo-code 400F combines the scores from the individual trees. The similarity score 206 for all trees is included into similarity matrix 150.

FIGS. 4G, 4H and 4I illustrate example pseudo-codes 400G, 400H and 400I for traversing the trees in ensemble of trees to determine leaf nodes, the distance between the leaf nodes, and the depth of the trees, according to some embodiments.

FIG. 4J illustrates an example pseudo-code 400J that determines a similarity matrix, according to some embodiments. In FIG. 4J, the pseudo-code 400J receives objects 140 and generates similarity matrix 150 that includes similarity scores 206. Unlike pseudo-code 400F, pseudo-code 400J generates similarity scores based on the distance between objects in a single tree, such that the distance is a measure of the depth of the deepest common node shared between the objects divided by the depth of the tree. The similarity scores from each tree may then be adjusted to accommodate for the importance of the tree and then combined to generate similarity score 206. The deepest common node shared between the objects and the depth of the tree may be determined using pseudo-code 400G, 400H and 400I.

Figure 5:
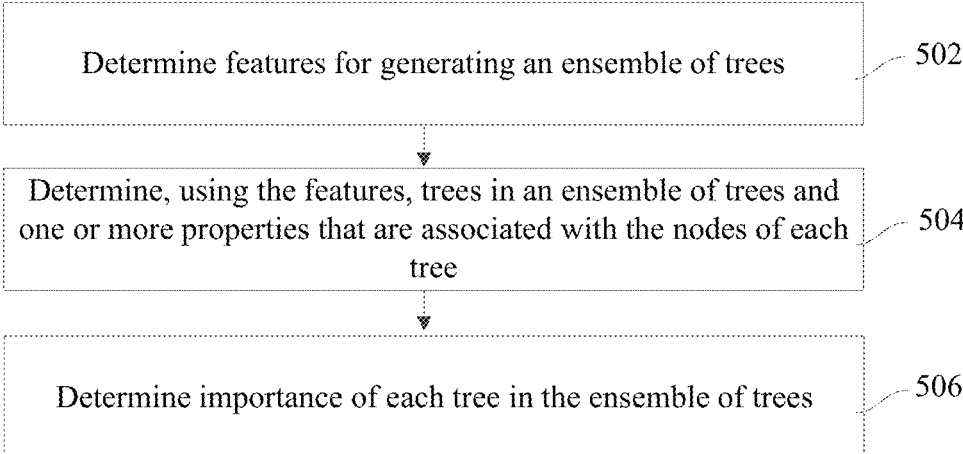
FIG. 5 is a simplified diagram of a method for determining an ensemble of trees in a similarity framework, according to some embodiments.

FIG. 5 is a simplified diagram of a method 500 for determining an ensemble of trees in a similarity framework, according to some embodiments. One or more of the processes 502-506 of method 500 may be implemented, at least in part, in the form of executable code stored on non-transitory, tangible, machine-readable media that when run by one or more processors may cause the one or more processors to perform one or more of the processes 502-506.

At process 502, features are determined. For example, similarity framework 130 is trained on input data, which may be a training dataset of features. The features may be specific to objects of a particular type and may be extracted from an object. Features may be static, dynamic, or engineered. Static features may be features that do not change with time over a period of time. Dynamic feature may be features that change over a period of time. Engineered features may be created using static and dynamic features. In some embodiments, when objects include unstructured data, static, dynamic, and engineered features may be encoded into structured features using encoder 204.

At process 504, an ensemble of trees is generated. For example, similarity framework 130 may generate an ensemble of trees 202 using features and the GBM algorithm. The trees in the ensemble of trees 202 may be constructed to minimize a variance the features. Specifically, the similarity framework 130 constructs and reconstructs trees using a base function that receives features as input and generates labels, such that the function loss during the reconstruction is minimized Each tree in the ensemble of trees 202 may include one or more properties at each node of each tree with exception of the leaf nodes. As illustrated in FIGS. 3A and 3B, the nodes may include one or more properties and corresponding values of the one or more properties that may be compared against features of the objects 140.

At process 506, tree importance for each tree in the ensemble of trees is determined. For example, similarity framework 130 may determine an importance of each tree in the ensemble of trees 202 by determining the accuracy of the ensemble of trees 202 before and after each tree is added to ensemble of trees 202. The tree importance may correspond to how important the tree is to determining similarity between objects 140. The measure of the importance may be a weight having a value between zero and one.

Once method 500 completes, the similarity framework 130 has generated ensemble of trees 202 and determined the measure of importance of each tree in ensemble of trees 202. At this point, similarity framework 130 may enter an inference stage where the similarity framework 130 determines similarity between objects 140.

FIG. 6 is a simplified diagram of a method 600 for determining similarity between objects, according to some embodiments. One or more of the processes 602-608 of method 600 may be implemented, at least in part, in the form of executable code stored on non-transitory, tangible, machine-readable media that when run by one or more processors may cause the one or more processors to perform one or more of the processes 602-608.

At process 602, objects are received. For example, similarity framework 130 receives objects 140. The objects 140 may be the same type of objects that were used to train similarity framework 130 to generate the ensemble of trees 202.

At process 604, objects are propagated through trees in the ensemble of trees. For example, similarity framework 130 propagates objects 140 received in process 602 through each tree in ensemble of trees 202 until objects 140 reach the leaf nodes of the trees. Typically, each object 140 may be propagated through each tree in the ensemble of trees 202. As the objects are propagated, the similarity framework 130 compares the features of the object 140 to properties of the nodes of the tree in the object's path to the leaf node.

At process 606, a similarity score for pairs of objects is determined. For example, similarity framework 130 may determine a similarity score 206 for every two objects. First, similarity framework determines a similarity score for pairs of objects in each tree in ensemble of trees 202. In one instance, the similarity score for a pair of objects in the same tree may be one if the objects share the same leaf node and zero otherwise. In another instance, the similarity score may be a measure of a distance between leaf node(s) of the tree that store the pair of objects. The similarity score for the pair of objects in each tree may be determined based on the tree distance and the tree height. For example, the similarity score may be a measure of the distance from the root node to the last node that the two objects share that is divided by the depth of the tree. In some embodiments, the similarity score is further adjusted based on the tree importance. The object similarity score 206 may then be determined by combining the similarity scores for the pair of objects from each tree in the ensemble of trees 202. Process 606 repeats until similarity framework 130 determines similarity scores 206 for all pairs of objects in objects 140.

At process 608, a similarity matrix is generated. For example, the similarity score 206 for all pairs of objects determined in process 606 is stored in the similarity matrix 150.

Going back to FIG. 1, similarity framework 130 determines similarity matrix 150. The similarity scores between objects in similarity matrix 150 may identify similarity between objects 140. As discussed above, objects 140 may include structured or unstructured data. If objects 140 include unstructured data, similarity framework 130 may pass the objects through an encoder that may encode the unstructured data into encodings which are structured data. In this way, similarity framework 130 may identify similarities between objects 140 that store unstructured data, such as similar images, similar articles, similar documents, etc., as well as structured data, such as securities or transactions.

Objects 140 may be transactions. When objects 140 are transactions, similarity framework 130 may be trained on the training data that includes transaction features for a predefined objective. Once trained, similarity framework 130 may identify, e.g., for a fraud objective, similar and different transactions based on the transaction features. The transactions or a cluster of transactions that similarity framework 130 determines as different, may be considered outlier. An outlier transaction is a transaction that has different features from other transactions, or a transaction that is not included in the training dataset. Outlier transactions may be indicative of fraud. In another example, outlier transactions may be indicative of data errors elsewhere in a transaction processing system. For example, suppose similarity framework 130 is trained on a training dataset that includes previous transactions that passed through a transaction system and that are known to be genuine or include valid data. During an inference stage, similarity framework 130 may identifier outlier transactions that are indicative of transactions that are different from transactions that have previously passed through the transaction system and were included in the training data. Different transactions may be transactions that have similarity score 150 below a similarity threshold for one or more entries in similarity matrix 150. These transactions may be indicative of fraudulent transactions or transactions that included erroneous data.

In some embodiments, similarity framework 130 may quantify uncertainty in the data. For example, similarity framework 130 may be trained on a training dataset that includes objects. Once trained, similarity framework 130 may receive objects and determine how similar an object in objects 140 is to the data in the training dataset. An object that is not similar may be considered an outlier or be out of training distribution. In some instances, similarity framework 130 may also include a classifier. The classifier may indicate how similar object 140 may be to data in the training dataset.

Some examples of computing devices, such as computing device 100 may include non-transitory, tangible, machine readable media that include executable code that when run by one or more processors (e.g., processor 110) may cause the one or more processors to perform the processes of methods 500 and 600. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for determining similarity between objects, the method comprising:
  generating, using a processor and a machine learning similarity framework, an ensemble of binary trees using training features of a training dataset, wherein the generating the ensemble of binary trees further comprises:
    randomly generating a plurality of hyperparameters;
    generating a plurality of trees using the plurality of hyperparameters and training features;
    determining a score for each tree in the plurality of trees using validation features in a validation dataset;
    determining a score for each hyperparameter from the plurality of hyperparameters based on scores for a subset of trees from the plurality of trees associated with the each hyperparameter;
    selecting a hyperparameter from the plurality of hyperparameters based on scores for the plurality of hyperparameters; and
    selecting the subset of trees corresponding to the selected hyperparameter into the ensemble of binary trees;
  for each tree in the ensemble of binary trees:
    propagating the objects through the each tree from a top node and until the objects reach leaf nodes of the each tree, wherein a propagating path through the each tree is based on comparing at least one feature associated with each object in the objects to at least one property of at least one node associated with the each tree; and
  determining a similarity score for each pair of objects from the objects in the leaf nodes of the each tree, wherein determining the similarity score further comprises:
    determining a deepest common node between a first object and a second object in the each pair of objects in the each tree; and
    determining a depth of the each tree, wherein determining the similarity score is based on the deepest common node and the depth of the each tree; and
  for the each pair of objects, combining the similarity score from the each tree in the ensemble of binary trees into an object similarity score, wherein the object similarity score is indicative of a similarity between the each pair of objects; and
  identifying, using object similarity scores that are below a similarity threshold, an object that is different from other objects, wherein the object that is different from other objects includes erroneous data in one or more features.

2. The method of claim 1, further comprising:
  generating a similarity matrix, the similarity matrix including the object similarity scores for pairs of objects propagated through the ensemble of trees, wherein each row and each column in the similarity matrix represents the objects and entries representing the object similarity scores corresponding to the each of the pairs of objects.

3. The method of claim 1, wherein determining the similarity score for the each pair of objects comprises:
  assigning the similarity score of one when the first object and the second object in the each pair of objects are associated with the same leaf node in the leaf nodes of the each tree; or
  assigning the similarity score of less than one when the first object and the second object in the each pair of objects are associated with different leaf nodes in the leaf nodes of the each tree.

4. The method of claim 1, wherein the generating the ensemble of binary trees comprises:
  determining a tree importance for the each tree in the ensemble of binary trees; and
  wherein determining the similarity score for the each of the pair of objects is based on the tree importance for the each tree.

5. The method of claim 4, further comprising:
  determining the tree importance of the each tree in the ensemble of trees by calculating an error of the ensemble of trees before and after adding the each tree to the ensemble of trees.

6. The method of claim 1, wherein the generating the ensemble of trees uses a loss function and a gradient of the loss function.

7. A system for determining similarity between objects, the system comprising:
  at least one memory storing a similarity framework with an ensemble of binary trees; and
  at least one processor coupled to the memory and configured to read instructions associated with the similarity framework to cause the system to perform operations, the operations comprising:
    generating, using a processor and a machine learning similarity framework, an ensemble of binary trees using training features of a training dataset, wherein the generating the ensemble of binary trees further comprises:

generating a plurality of trees using a plurality of hyperparameters and training features;

determining a score for each tree in the plurality of trees using validation features in a validation dataset;

determining a score for each hyperparameter from the plurality of hyperparameters based on scores for a subset of trees from the plurality of trees associated with the each hyperparameter;

selecting a hyperparameter from the plurality of hyperparameters based on scores for the plurality of hyperparameters; and selecting the subset of trees corresponding to the selected hyperparameter into the ensemble of binary trees;

for each tree in the ensemble of binary trees:

propagating the objects through the each tree until the objects reach leaf nodes of the each tree, wherein the propagating compares at least one feature associated with each object in the objects to at least one property of at least one node associated with the each tree; and determining a similarity score for each of two objects from the objects in the leaf nodes, wherein determining the similarity score further comprises:

determining a deepest common node between a first object and a second object in the two objects in the each tree; and determining a depth of the each tree, wherein determining the similarity score is based on the deepest common node and the depth of the each tree; and for each of the two objects, combining similarity scores from the each tree in the ensemble of trees into an object similarity score; and identifying, using object similarity scores and a similarity threshold, a pair of similar objects.

8. The system of claim 7, wherein the operations further comprise:

generating a similarity matrix, the similarity matrix including object similarity scores for the objects, the similarity matrix including rows and columns, wherein each row and each column represents the objects and entries representing the object similarity scores corresponding to the each of the two objects.

9. The system of claim 7, wherein the operations further comprise:

assigning the similarity score of one when the each of the two objects are associated with the same leaf node in the leaf nodes of the each tree; or assigning the similarity score of less than one when the each of the two objects are associated with different leaf nodes in the leaf nodes of the each tree.

10. The system of claim 7, wherein the operations further comprise:

determining a tree importance for the each tree in the ensemble of trees; and wherein the similarity score for the each of the two objects is based on the tree importance for the each tree.

11. The system of claim 10, wherein the operations further comprise:

determining the tree importance of the each tree in the ensemble of binary trees by calculating an error of the ensemble of binary trees before and after adding the each tree to the ensemble of trees.

12. The system of claim 7, wherein the similarity score identifies similarity in the at least one feature of the two objects.

13. The system of claim 12, wherein the first object in the each of the two objects is a first transaction and the second object in the each of the two objects is a second transaction, and the similarity score identifies the first transaction as a fraudulent transaction.

14. The system of claim 7, wherein the first object in the each of the two objects is an object from a training dataset and the second object in the each of the two objects is a new object, and the similarity score identifies whether the new object is an outlier to the object in the training dataset.

15. The system of claim 7, wherein the similarity framework further comprises an encoder; and the operations further comprise:

encoding the at least one feature associated with each object into an encoded feature; and comparing the at least one encoded feature to the at least one property of the at least one node associated with the each tree.

16. A non-transitory computer readable medium having instructions stored thereon, that when executed by a processor, cause the processor to perform operations, the operations comprising:

generating, using a machine learning similarity framework, an ensemble of binary trees;

for each tree in the ensemble of binary trees:

propagating objects that include images through the each tree until the objects reach leaf nodes of the each tree, wherein the propagating compares at least one feature associated with each object in the objects to at least one property of at least one node associated with the each tree; and determining a similarity score for each of two objects from the objects in the leaf nodes, wherein determining the similarity score further comprises:

determining a deepest common node between a first object and a second object in each of the two objects in the each tree; and determining a depth of the each tree, wherein determining the similarity score is based on the deepest common node and the depth of the each tree; and for each of the two objects, combining similarity scores from the each tree in the ensemble of trees into an object similarity score, wherein the object similarity score indicates a similarity between the two objects;

identifying using object similarity scores and a similarity threshold, an object with an image similar to other objects with other images; and substituting, the object with the image in place of the other objects in an image recognition system.

17. The non-transitory computer readable medium of claim 16, wherein generating the ensemble of trees further uses at least one hyperparameter, wherein the at least one hyperparameter controls depth of the each tree in the ensemble of binary trees and a number of leaf nodes in the at least one tree in the ensemble of binary trees.

18. The non-transitory computer readable medium of claim 16, wherein the operations further comprise:

generating a similarity matrix, the similarity matrix including entries storing object similarity scores for each of the two objects in the objects, wherein each row and each column in the similarity matrix represents the objects.

19. The non-transitory computer readable medium of claim 16, wherein the generating the ensemble of binary trees comprises:

determining a tree importance for the each tree in the ensemble of binary trees; and wherein determining the similarity score for the each of the pair of objects is based on the tree importance for the each tree.

20. The non-transitory computer readable medium of claim 19, further comprising:

determining the tree importance of the each tree in the ensemble of trees by calculating an error of the ensemble of trees before and after adding the each tree to the ensemble of trees.

\* \* \* \* \*